(12) United States Patent
Boyd et al.

(10) Patent No.: US 6,485,670 B1
(45) Date of Patent: Nov. 26, 2002

(54) BLOW MOLDING METHOD FOR PRODUCING PASTEURIZABLE CONTAINERS

(75) Inventors: Timothy J. Boyd, Ypsilanti; Kerry W. Silvers, Chelsea; Dwayne G. Valliencourt, Manchester; G. David Lisch, Jr., Jackson, all of MI (US)

(73) Assignee: Schmalbach-Lubeca AG (DE)

(*) Notice: Subject to any disclaimer, the term of this patent is extended or adjusted under 35 U.S.C. 154(b) by 0 days.

(21) Appl. No.: 09/436,864

(22) Filed: Nov. 9, 1999

(51) Int. Cl.[7] .............................................. B29C 49/64
(52) U.S. Cl. ...................... 264/521; 264/528; 264/900; 264/903; 264/904
(58) Field of Search ................................ 264/523, 900, 264/904, 903, 528, 521

(56) References Cited

U.S. PATENT DOCUMENTS

| | | |
|---|---|---|
| 4,039,641 A | 8/1977 | Collins |
| 4,091,059 A | 5/1978 | Ryder |
| 4,151,250 A | 4/1979 | Barry et al. |
| 4,154,920 A | 5/1979 | Jabarin |
| 4,244,913 A | 1/1981 | Ryder |
| 4,264,558 A | 4/1981 | Jacobsen |
| 4,385,089 A | 5/1983 | Bonnebat et al. |
| 4,476,170 A | 10/1984 | Jabarin |
| 4,512,948 A | 4/1985 | Jabarin ........................ 264/521 |
| 4,522,779 A | 6/1985 | Jabarin |
| 4,790,741 A | 12/1988 | Takakusaki et al. |
| 4,850,850 A | 7/1989 | Takakusaki et al. |
| 4,863,046 A | 9/1989 | Collette et al. |
| 4,883,631 A | 11/1989 | Ajmera |
| 5,229,043 A * | 7/1993 | Lee .............................. 264/37 |
| 5,261,545 A | 11/1993 | Ota |

FOREIGN PATENT DOCUMENTS

WO    WO 96/30190    10/1996

OTHER PUBLICATIONS

The Crystallization of Oriented Poly(ethyleneterephthalate), F.S. Smith and R.D. Steward, Cl Fibres, Hookstone Road, Harrogate, Yorkshire HG2 8QN, UK, Received May 15, 1973; revised Jun. 26, 1973.

The Crystallization of Poly(ethyleneterephthalate) and Related Copolymers, J.B. Jackson and F.W. Longman, Paper Presented at the SPE 27th Annual Technical Conference, Chicago, May 1969.

Crystallization and Thermal Stabilization of Heat Set PET, S.A. Jabarin, accepted for publication in the Polymeric Materials Encyclopedia.

* cited by examiner

Primary Examiner—Suzanne E. McDowell
(74) Attorney, Agent, or Firm—Harness, Dickey & Pierce, P.L.C.

(57) ABSTRACT

A method for producing a biaxially oriented, heat set plastic container, including the steps of providing a plastic preform within a mold cavity; expanding and stretching the plastic preform into conformity with the surfaces defining the mold cavity to form a biaxially oriented plastic container; inducing crystallinity in the plastic container by using convection heat transfer to heat a surface of the plastic container to a temperature of at least 120° C.; and removing the plastic container from the mold cavity. The PET containers produced by the method have an average sidewall crystallinity greater than about 30%, which allows the PET container to maintain its material integrity during any subsequent pasteurization or retort process of the contents in the PET container, and during shipment of the PET container.

13 Claims, 6 Drawing Sheets

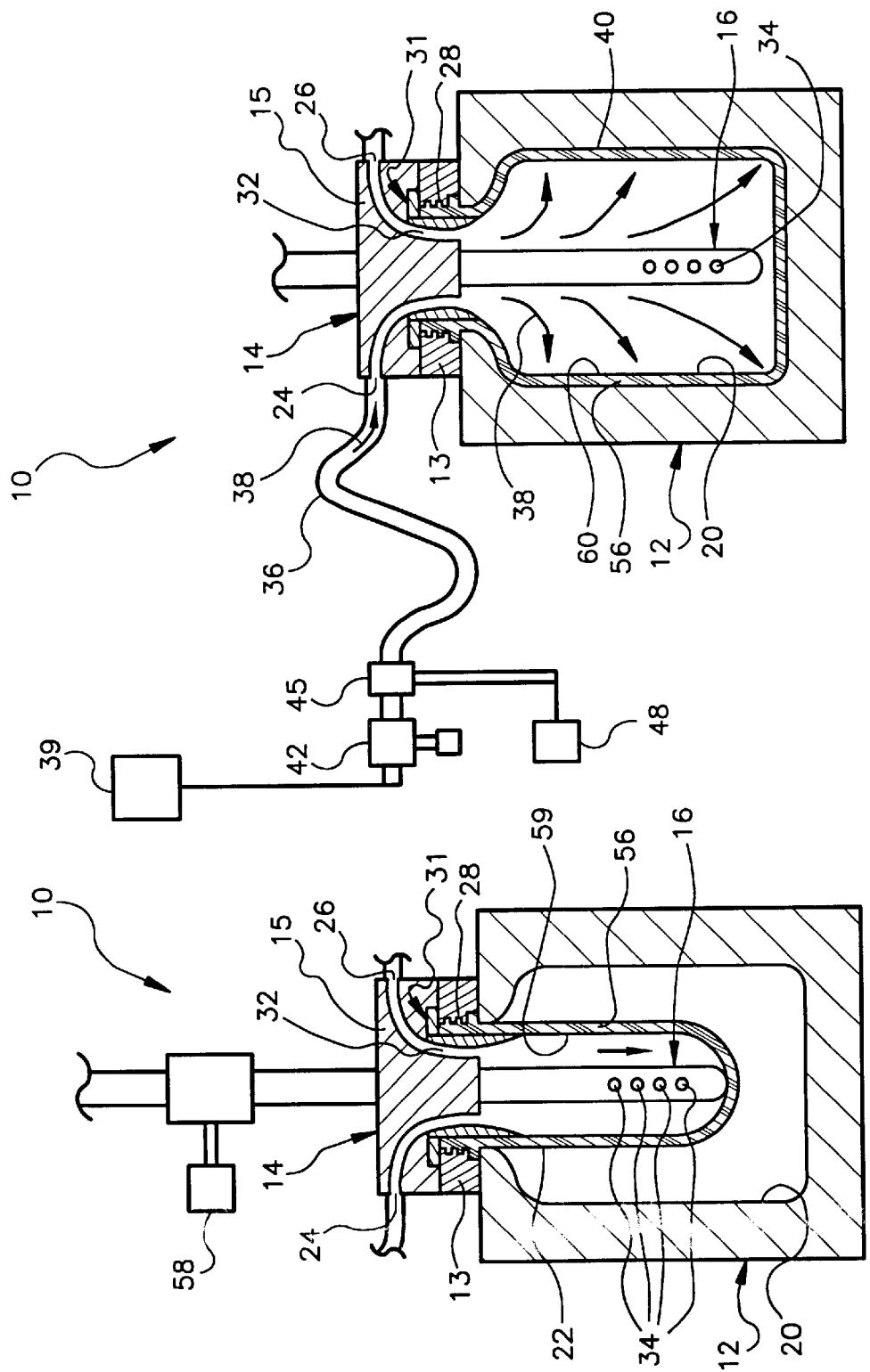

BLOW MOLDING METHOD FOR PRODUCING PASTEURIZABLE CONTAINERS

TECHNICAL FIELD OF THE INVENTION

This invention generally relates to blow molding methods and machines for producing heat set plastic containers. More specifically, this invention relates to blow molding methods and machines for producing biaxially oriented plastic containers with high crystallinity sidewalls.

BACKGROUND

Recently, manufacturers of polyethylene terephthalate (PET) containers have begun to supply plastic containers for commodities that were previously packaged in glass containers. The manufacturers, as well as consumers, have recognized that PET containers are lightweight, inexpensive, recyclable, and manufacturable in large quantities. Manufacturers currently supply PET containers for various liquid commodities, such as juices. They also desire to supply PET containers for solid commodities, such as pickles. Many solid commodities, however, require pasteurization or retort, which presents an enormous challenge for manufactures of PET containers.

Pasteurization and retort are both methods for sterilizing the contents of a container after it has been filled. Both processes include the heating of the contents of the container to a specified temperature, usually above 70° C., for duration of a specified length. Retort differs from pasteurization in that it also applies overpressure to the container. This overpressure is necessary because a hot water bath is often used and the overpressure keeps the water in liquid form above its boiling point temperature. These processes present technical challenges for manufactures of PET containers, since new pasteurizable and retortable PET containers for these food products will have to perform above and beyond the current capabilities of conventional heat set containers. Quite simply, the PET containers of the current techniques in the art cannot be produced in an economical manner such that they maintain their material integrity during the thermal processing of pasteurization and retort and during subsequent shipping.

PET is a crystallizable polymer, meaning that it is available in an amorphous form or a semi-crystalline form. The ability of a PET container to maintain its material integrity is related, in part, to the percentage of the PET container in crystalline form, also known as the "crystallinity" of the PET container. Crystallinity is characterized as a volume fraction by the equation:

$$Crystallinity = \frac{\rho - \rho_a}{\rho_c - \rho_a}$$

where $\rho$ is the density of the PET material; $\rho_a$ is the density of pure amorphous PET material (1.333 g/cc); and $\rho_c$ is the density of pure crystalline material (1.455 g/cc).

The crystallinity of a PET container can be increased by mechanical processing and by thermal processing.

Mechanical processing involves orienting the amorphous material to achieve strain hardening. This processing commonly involves stretching a PET container along a longitudinal axis and expanding the PET container along a transverse axis. The combination promotes biaxial orientation. Manufacturers of PET bottles currently use mechanical processing to produce PET bottles having roughly 20% crystallinity (average sidewall crystallinity).

Thermal processing involves heating the material (either amorphous or semi-crystalline) to promote crystal growth. Used by itself on amorphous material, thermal processing of PET material results in a spherulitic morphology that interferes with the transmission of light. In other words, the resulting crystalline material is opaque (and generally undesirable as the sidewall of the container). Used after mechanical processing, however, thermal processing results in higher crystallinity and excellent clarity. The thermal processing of an oriented PET container, which is known as heat setting, typically includes blow molding a PET preform against a heated blow mold, (at a temperature of 120–130° C.) and holding the blown container for about 3 seconds. Manufacturers of PET juice bottles, which must be hot filled at about 85° C., currently use heat setting to produce PET juice bottles having a range of up to 25–30% crystallinity. Although these hot fill PET containers exhibit a significant improvement over the non-hot fill PET containers, they cannot maintain material integrity during the thermal processing of pasteurization and retort.

A logical extension of this heat setting process involves blow molding a PET preform against a blow mold that is held at a considerably higher temperature, up to 250° C., as discussed in the Jabarin references (U.S. Pat. No. 4,476,170 and U.S. Pat. No. 4,512,948). In theory, a manufacturer using this process could produce a PET container having over 50% crystallinity which allows the PET container to maintain its material integrity properties during a subsequent pasteurization or retort process of the contents in the PET container as well as during any subsequent shipment of the PET container. However, once this heat setting process has been completed, the PET container must be removed from the mold. At a temperature around 250° C., upon removal of the PET container will instantly shrink and possibly collapse.

Recognizing this disadvantage, the Jabarin references offer two options for removing the PET containers: (1) lowering the mold temperature to the point where the PET container may be removed without any deformation, and (2) removing the PET container while applying internal pressure sufficient to resist any subsequent shrinkage thereafter and reducing the pressure when the bottle has reached a self-sustaining temperature. Neither of these options are commercially feasible. The first option involves extremely long cycle times (unless expensive liquid nitrogen machinery is employed) while the second option involves extremely complex processing to control the inherent variability of the system.

Thus, the manufacturers of PET containers desire an efficient and inexpensive method and apparatus that produces PET containers having high average sidewall crystallinities greater than 30%, which allow the PET containers to maintain their material integrity during any subsequent pasteurization or retort of the contents in the PET container, and during shipment of the PET containers. It is therefore an object of this invention to provide such a container that overcomes the problems and disadvantages of the conventional techniques in the art.

SUMMARY OF THE INVENTION

Accordingly, this invention provides for an efficient blow molding method and machine that produces PET containers having high average sidewall crystallinities of at least 30%, which allow the PET containers to maintain their material integrity during any subsequent high performance pasteurization or retort of the contents in the PET containers, and during shipment of the PET containers. As used herein, "high performance" pasteurization and retort are pasteurization and retort processes where the container is exposed to temperatures greater than about 80° C.

At its broadest, the invention is a method of producing a heat set plastic container including the steps of providing a plastic preform within a mold cavity; expanding and stretching the preform into conformity with surfaces defining the mold cavity; circulating a high-temperature gas through the interior of the plastic container to induce crystallinity in the plastic container; and mixing the high-temperature gas with a fluid such that the heat transfer coefficient of the high-temperature gas and the fluid mixture is greater than the heat transfer coefficient of the high-temperature gas.

The invention also includes a blow molding machine for producing a heat set container from a plastic preform according to the method mentioned above. Briefly, the machine includes a blow mold defining a mold cavity, which is capable of receiving a plastic preform. A high-temperature gas source and a fluid source communicate with a blow core assembly that engages the plastic preform. A mixer, which is coupled to the high-temperature gas source and to the fluid source, selectively mixes the high-temperature gas with the fluid and produces a mixture with a heat transfer coefficient that is greater than the heat transfer coefficient of the high-temperature gas. The blow core assembly further includes an exhaust to exhaust the mixture from the interior portion of the preform. A controller coupled to the high-temperature gas source and to the fluid source selectively controls the supply of the high-temperature gas and the fluid to the blow core assembly. The controller is also coupled to the exhaust to selectively control the exhaust of the mixture. By introducing a fluid into the high-temperature gas, the heat transfer coefficient of the high-temperature gas is effectively increased. Because of this increase, heat is transferred to the plastic container more rapidly and the temperature of the plastic container reaches a target temperature more quickly. Thus, by mixing a fluid into the high-temperature gas, the cycle time to produce a high crystallinity, heat set container may be reduced and efficiency may be increased.

Further features and advantages of the invention will become apparent from the following discussion and accompanying drawings.

BRIEF DESCRIPTION OF THE DRAWINGS

FIGS. 1–4 are schematic cross-sectional views of a portion of a blow molding machine of the present invention during various stages and processes taken along a line generally bisecting the blow molding machine;

DETAILED DESCRIPTION OF THE PREFERRED EMBODIMENT

Figure 1:
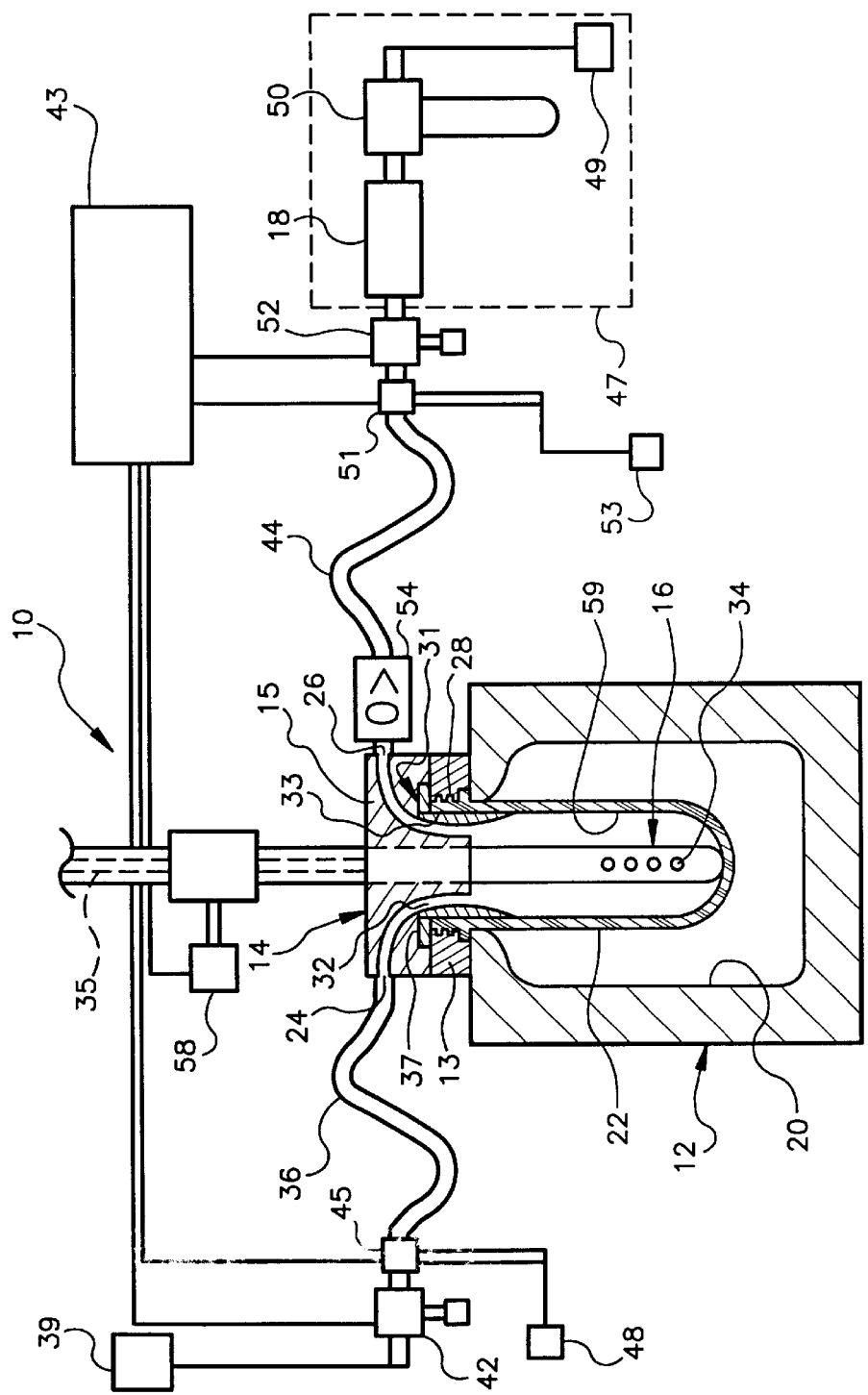

As shown in FIG. 1, the blow molding machine of the present invention has a blow molding station 10 that generally includes a blow mold 12, a neck ring 13, a blow core assembly 14, a stretch rod 16, and a heating element 18. While the machine itself will have other stations and components, those are conventional in nature and need only be briefly discussed below.

Two styles of blow molding machines exist, one-step machines and two-step machines. The difference between them is that in a one-step machine, a plastic preform is both injection molded and blow molded while in a two-step machine, an already formed plastic preform is fed into the machine and then blow molded. Each machine includes various stations. The number and type of these stations will differ from machine to machine. Generally, the stations may include either a preform injection molding station or a preform infeed station, a preform conditioning station, a blow mold station and a bottle outtake station. The present invention particularly involves the blow molding station 10 of either a one or two-step machine, but particularly a two step machine. As such, only the blow molding station 10 is described in detail.

The blow mold 12 itself includes two separable halves (hydraulically or pneumatically controlled, the actuators not being shown) that cooperate to define a mold cavity 20, which functions to receive a plastic preform 22 conditioned for blow molding. The blow mold 12 is made from appropriate materials, such as steel, to withstand and to hold temperatures of about 120–250° C., typically 130–170° C. The mold cavity 20 is designed with an appropriate shape to ultimately define the contours of the exterior surface of the desired plastic container.

The neck ring 13 (also hydraulically or pneumatically actuated, the actuators not being shown) is located above the blow mold 12 and adapted to receive, hold and position the plastic preform 22 in an appropriate location relative to the mold cavity 20 during the blow molding and heat setting processes. To accomplish this function, the neck ring 13 defines an annular receiving cavity 28 of a shape and size to receive the neck of the plastic preform 22.

The blow core assembly 14 engages the top of the plastic preform 22 to allow for the injection of a fluid medium into the plastic preform 22. To accomplish this function, the assembly 14 includes a blow core manifold 15 to which is mounted, in a conventional manner, a blow seal 31. The blow seal 31 defines an annular channel 32 that communicates with a first inlet port 24 and a second inlet port 26, as further discussed below. The neck ring 13, as well as the blow core manifold 15 and the blow seal 31, are all made from a strong material, such as steel.

The stretch rod 16, also a part of the blow core assembly 14, extends generally through the center of the blow core manifold 15 and is movable from a retracted position, as shown in FIG. 1, to an extended position, as shown in FIG. 2. The stretch rod 16 functions to stretch the plastic preform 22 along a longitudinal axis and to induce axial orientation into the plastic material of the plastic preform 22. In the preferred embodiment of the present invention, the stretch rod 16 includes several exhaust ports 34. The exhaust ports 34 function to exhaust fluids from the plastic preform 22, as further explained below. The exhaust ports 34 communicate with a channel 35 inside the stretch rod 16 to convey the fluids to an exhaust area (not shown). The stretch rod 16 is made from a strong material, such as steel.

As shown in FIGS. 1 and 3, the first inlet port 24 is connected to a high-pressure conduit 36, which supplies a high-pressure gas 38 from a high-pressure gas source 39. The high-pressure gas 38 functions to expand the plastic preform 22 against the mold cavity 20 and to thereby form a biaxially oriented plastic container 40 in a process commonly referred to as blow molding. A control valve 42 controls the flow of the high-pressure gas 38. The control valve 42 may be either manually or electronically controlled, but in the preferred embodiment the control valve 42 is automatically and systematically controlled by a system controller 43, as further explained below. The high-pressure conduit 36 is made from a flexible material, which permits movement and retraction of the blow core assembly 14 as it engages and disengages during the blow molding process.

A first mixer 45, which is controlled by the system controller 43 and is connected to a first mixing fluid source 48, communicates with the high-pressure conduit 36. The first mixer 45 functions to selectively introduce a first mixing fluid into the high-pressure gas 38 to effectively increase the heat transfer coefficient of the high-pressure gas. The first mixer 45 preferably includes a vaporizer, but may alternately include other devices, such as an atomizer, that would effectively and efficiently introduce and mix the first mixing fluid into the high-pressure gas. The first mixing fluid preferably is water, but may alternately be and include other fluids with relatively high heat transfer coefficients. Vaporizers and atomizers, such as the first mixer 45, are well known in the art of fluid mechanics and their implementation into the blow molding machine of the present invention would be readily understood by a person skilled in the art.

Figure 4:
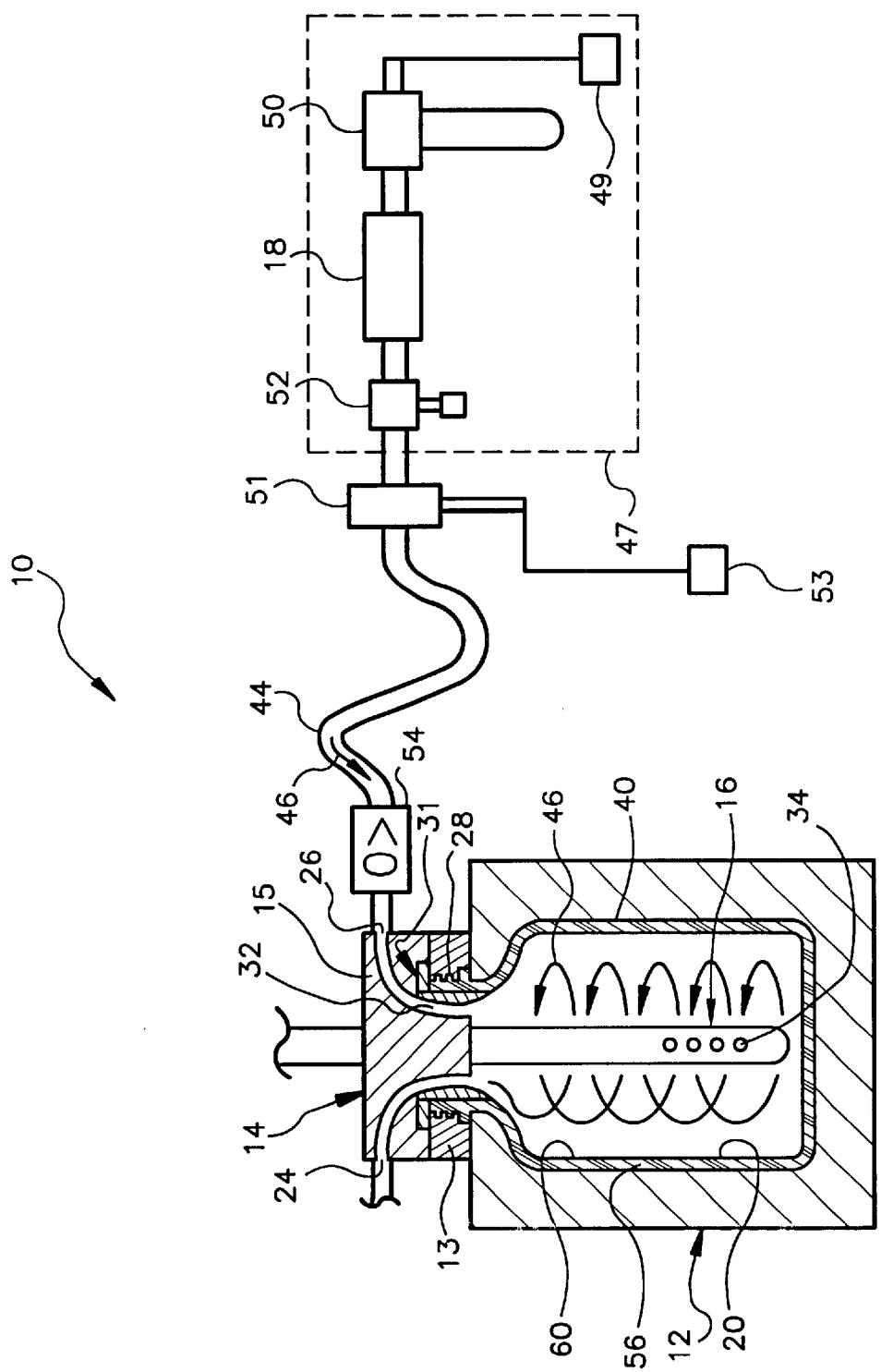

As also shown in FIGS. 1 and 4, the second inlet port 26 is connected to a high-temperature conduit 44, which supplies a high-temperature gas 46 from a high-temperature gas source 47. The high-temperature gas 46 functions to heat set the plastic container 40, through a convection heat transfer, and to thereby form a biaxially oriented, heat set plastic container 40. The term "convection heat transfer" is defined as the transfer of heat from a fluid to a solid, by way of the fluid flowing over or near the surface of the solid. "Convection heat transfer" actually includes both a conductive heat transfer and a convection heat transfer, but the combination of these two heat transfers is commonly referred to as simply "convection heat transfer."

To supply the high-temperature gas 46, a fluid from a fluid source 49 is passed through a filter 50 and the heating element 18. The heating element 18 may be one of a well-known variety, such as an electrical resistance heater, which may contain a ferrous alloy wound around a ceramic rod (not shown). A person of ordinary skill in the art will readily appreciate the various types of filters and heating elements capable of being used with the invention to produce the desired effects. In the preferred embodiment, the heating element 18 is small in size and high in intensity to heat the fluid from ambient air temperature to roughly the 370° C. temperature of the high-temperature gas 46.

A second mixer 51, which is controlled by the system controller 43 and is connected to a second mixing fluid source 53, communicates with the high-temperature conduit 44. The second mixer 51 functions to selectively introduce a second mixing fluid into the high-temperature gas 46 to effectively increase the heat transfer coefficient of the high-temperature gas 46. Because of this increase, heat from the high-temperature gas 46 is transferred to the plastic container 40 more rapidly and the temperature of the plastic container 40 reaches a target temperature more quickly, as further explained below. The second mixer 51 preferably includes a vaporizer, but may alternately include other devices, such as an atomizer, that would effectively and efficiently introduce and mix the second mixing fluid into the high-temperature gas 46. The second mixing fluid preferably is water, but may alternately be or include other fluids with relatively high heat transfer coefficients. The first mixing fluid and the second mixing fluid are preferably in a liquid state during ordinary conditions. Vaporizers and atomizers, such as the second mixer 51, are well known in the art of fluid mechanics and their implementation into the blow molding machine of the present invention would be readily understood by a person skilled in the art. As used herein, a vaporizer introduces either a fine spray of liquid droplets that almost instantly vaporize or introduces a fluid in a gaseous state, while an atomizer introduces a fine spray of liquid droplets.

Like the control valve 42, a control valve 52 controls the flow of the high-temperature gas 46 and may be either manually or electronically controlled. In the preferred embodiment, the control valve 52 is automatically and systematically controlled by the system controller 43, as further explained below. A check valve 54 functions to prevent the high-pressure gas 38 from traveling through the second inlet port 26 and into the high-temperature conduit 44. A person of ordinary skill in the art will readily appreciate the appropriate control valves and check valves.

The method of the present invention for producing a biaxially oriented, heat set plastic container having a sidewall with a high crystallinity generally includes blow molding process and a heat setting process. The blow molding process includes providing a properly conditioned plastic preform 22 in the mold cavity 20 of the blow mold 12 and closing the blow mold 12. The plastic preform 22 is preferably made from PET, but may be made from other crystallizable materials. The blow core assembly 14 is next lowered into the plastic preform 22 such that a collar 33 of the blow seal is positioned interiorly of the finish or neck of the plastic preform 22 and a flange 37 engages the top of the plastic preform 22, as shown in FIG. 1. The stretch rod 16 is then moved by the pneumatic or hydraulic actuator from its retracted position to its extended position, as shown in FIG. 2. This extension of the stretch rod 16 into the plastic preform 22 axially stretches the sidewall 56 of the plastic preform 22, and triggers the start of the fluid cycle.

Figure 5:
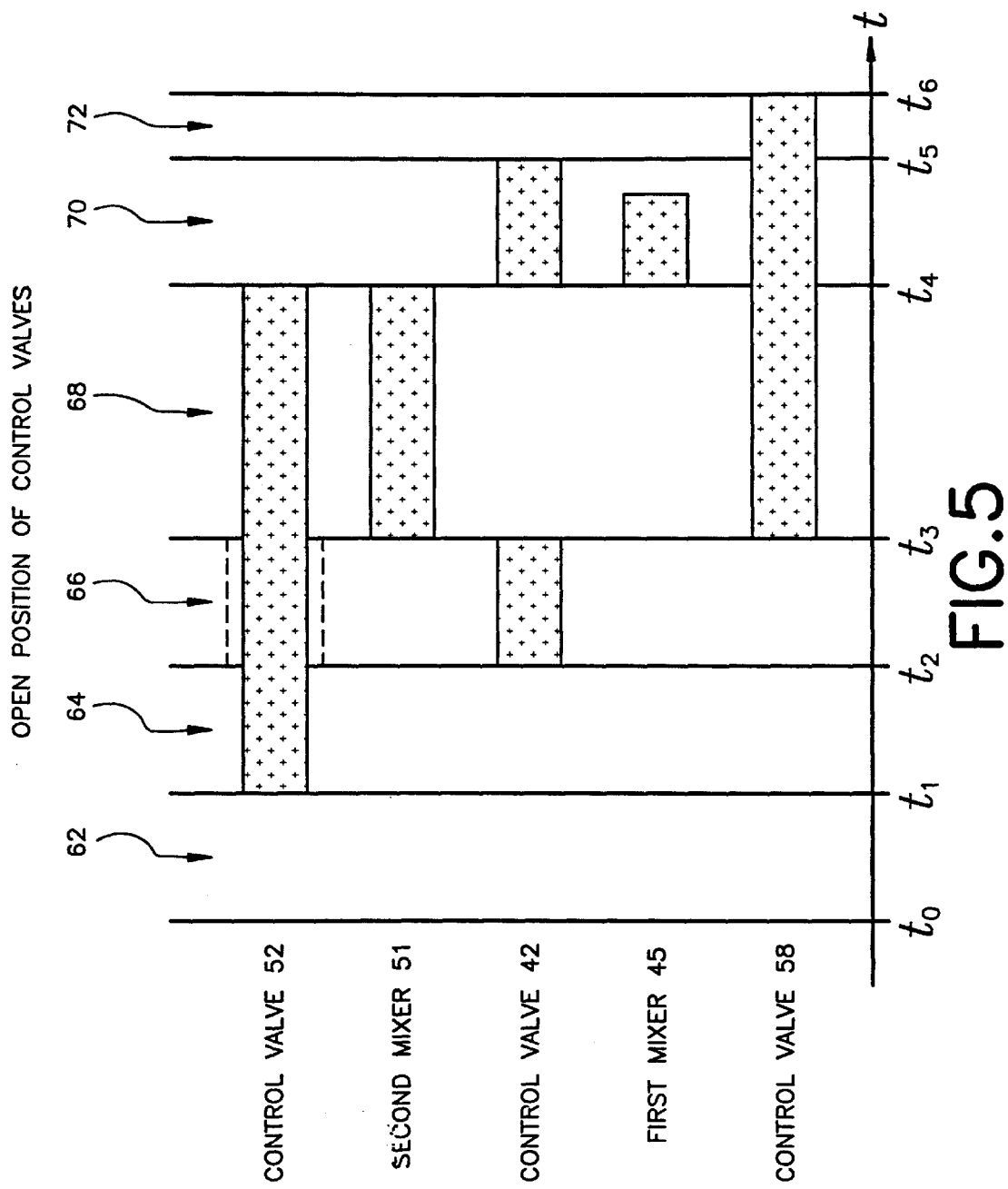
FIG. 5 is a timing chart for the control valves of the blow molding machine according to the blow molding method of the present invention.

The fluid cycle includes the opening and closing of the control valves 42 and 52 and a control valve 58, to blow mold the plastic preform 22 and to circulate the high-temperature gas 46 over an interior surface 59 of the plastic preform 22, as shown in FIGS. 2–4. The extension of the stretch rod 16 starts the fluid cycle at time=$t_0$, as shown in FIG. 5. After the time delay 62 from time=$t_0$ to time=$t_1$, the control valve 52 is opened and the high-temperature gas 46 is injected through the second inlet port 26, through the annular channel 32, and into the plastic preform 22. The pre-blow stage 64 occurs during axial stretching of the plastic preform 22 and operates to keep the stretching plastic preform 22 from contacting the stretch rod 16. The pre-blow stage 64 is in preparation for the blow molding process 66 and is of relatively short duration. The high-temperature gas 46 used in the pre-blow stage 64 is merely the preferred method; fluids from other sources with lower or higher temperatures may be used. At time=$t_2$, the control valve 42 is opened and the high-pressure gas 38 is injected through the first inlet port 24, through the annular channel 32, and into the plastic preform 22. This blow molding process 66 is timed to occur when the plastic preform 22 is pinned against the bottom of the blow mold 12 by the stretch rod 16. As the high-pressure gas 38 is injected into the plastic preform 22, the high-temperature gas 46 is not turned off via the control valve 52. Rather, the high-pressure gas 38 causes the check valve 54 to close, effectively shutting off the high-temperature gas 46, as shown by the dashed lines in FIG. 5. The high-pressure gas 38, which is preferably at a pressure of 500–600 psi, inflates and expands the plastic preform 22 against the mold cavity 20 of the blow mold 12. As the plastic preform 22 is stretched and expanded, it forms the biaxially oriented plastic container 40. Throughout the blow molding process 66, the blow mold 12 is held at a temperature of around 120–250° C., preferably 130–170° C.

Once the plastic container 40 has been fully stretched and expanded, at time=$t_3$, the second mixer begins to mix the second mixing fluid into the high-temperature gas 46, the control valve 58 is opened, and the control valve 42 is closed, shutting off the high-pressure gas 38. At this time, the control valve 52 remains open. During the circulation process 68, the high-temperature fluid 46 is exhausted through the exhaust ports 34 of the stretch rod 16. More importantly, the control valve 52 and the control valve 58 cooperate to circulate the high-temperature gas 46 and second mixing fluid over an interior surface 60 of the sidewall 56 of the plastic container 40. The high-temperature gas 46 and second mixing fluid exhaust through the exhaust ports 34, through the channel 35 in the stretch rod 16, past the control valve 58, and into the exhaust area (not shown).

The high-temperature gas 46 is circulated over the interior surface 60 of the plastic container 40 for a sufficient duration to allow the interior surface 60 of the plastic container 40 to reach a temperature of at least 120° C. Because of the introduction of the second mixing fluid, heat from the high-temperature gas 46 quickly and effectively transfers to the interior surface 60 of the sidewall 58, which reduces the time to produce the plastic container 40. The actual duration will depend on the composition of the high-temperature gas 46, the temperature and pressure of the high-temperature gas 46, the composition of the second mixing fluid, and the flow rate of the high-temperature gas 46 over the interior surface 60. In the preferred method, the high-temperature gas 46 is air, at a temperature between 200 to 400° C., preferably 285 to 370° C., and at a pressure typically between 100 to 300 psi, preferably 250 to 300 psi, but pressures up to 600 psi may be used. Also, in the preferred method, the second mixing fluid is water, at a sufficient temperature and pressure such that the second mixing fluid is quickly vaporized into the high-temperature gas 46. At the preferred values, the high-temperature gas 46 is circulated over the interior surface 60 of the plastic container 40 for 1 to 15 seconds, preferably 3 to 7 seconds, in order to transfer the necessary heat energy and in order to induce the appropriate amount of crystallinity into the plastic container 40.

After the conclusion of the circulation process 68, at time=$t_4$, the second mixer 51 stops, the control valve 52 is closed, and the control valve 42 is opened. During the cooling process 70, the first mixer 45 begins to mix the first mixing fluid into the high-pressure gas 38, and then the cooler high-pressure gas 38 and first mixing fluid is circulated over the interior surface 60 to reduce the temperature of the plastic container 40. The temperature of the plastic container 40 must be reduced to a temperature that allows the plastic container 40 to be removed from the mold cavity 20 without any shrinkage or other deformation. Because of the introduction of the first mixing fluid, heat from the plastic container 40 quickly and effectively transfers to the high-pressure gas 38, which further reduces the time to produce the plastic container 40. In the preferred method, the first mixing fluid is water, at a sufficient temperature and pressure such that the first mixing fluid is quickly vaporized into the high-pressure gas 38. In an alternative embodiment of the present invention, the second mixing fluid source 53 and the first mixing fluid source 48 may be the same component. To reduce the possibility of moisture remaining in the plastic container 40, the first mixer 45 may be stopped while the control valve 42 remains open. In this manner, the high-pressure would "blow-out" any remaining moisture in the plastic container 40.

After the cooling process 70, the control valve 42 is closed and shortly thereafter, as the final stage 72, the high-pressure gas 38 is exhausted, the control valve 58 is closed, the mold cavity 20 is opened, and the plastic container 40 is removed. This entire process is then repeated for the subsequent production of further plastic containers. Since the entire process can be completed in less than 6 seconds, the process provides an efficient and inexpensive method for producing plastic containers having a high crystallinity, which allows the plastic containers to maintain their material integrity during any subsequent pasteurization or retort of its contents, and during shipment.

Using the method of the invention, the plastic container 40 can be produced having a sidewall 56 with an average density greater than 1.37 g/cc. This average density roughly corresponds to a 30.3% crystallinity and will minimally allow the plastic containers 40. to maintain its material integrity during subsequent high performance pasteurization or retort of the contents in the plastic containers 40, and during shipment of the plastic containers 40. As used herein, crystallinities greater than 30% are considered "high crystallinities". Other average densities greater than 1.37 g/cc, including 1.375 g/cc (roughly corresponding to 34.4% crystallinity), 1.38 g/cc (roughly corresponding to 38.5% crystallinity), 1.385 g/cc (roughly corresponding to 42.6% crystallinity), and even 1.39 g/cc (roughly corresponding to 46.7% crystallinity) are possible with the method of the present invention and without significantly impacting the visually perceptible transparency or clarity of the plastic containers 40.

Figure 6:
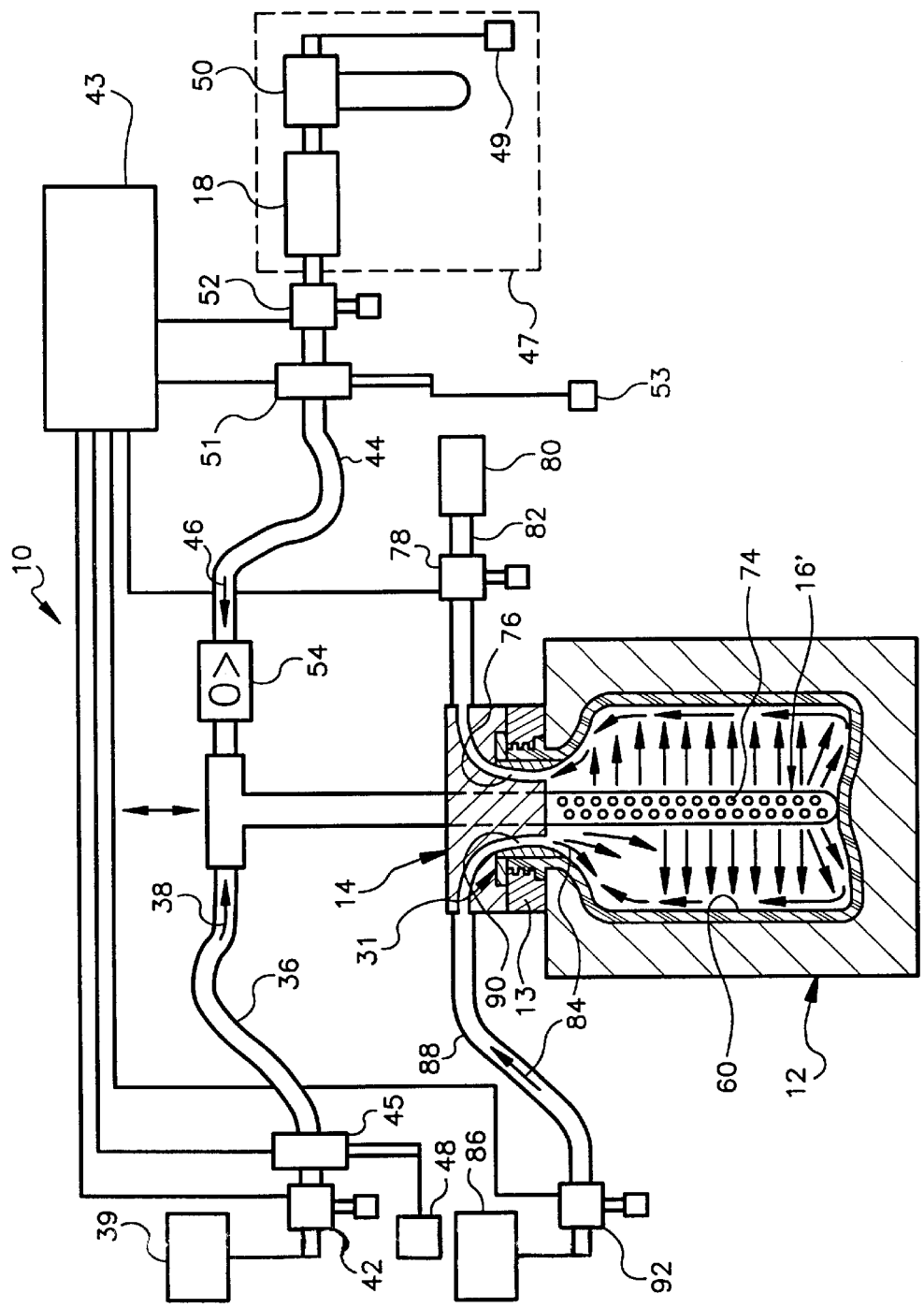
FIG. 6 is a schematic cross-sectional view of a portion of another embodiment of the present invention.

As shown in FIG. 6, an alternative embodiment of the invention is particularly adaptable to multi-cavity machines, which have more than one mold cavity where stretching and blowing occurs simultaneously. In this embodiment, the high-temperature gas 46, the high-pressure gas 38, the first mixing fluid, and the second mixing fluid are all provided as in the first embodiment (and therefore attention is directed to the discussion above regarding the same) except that they communicate through the stretch/blow rod 16'. Located along the length of a stretch/blow rod 16' are a large number of small diameter blow ports 74, preferably all of the same diameter. The ports 74 direct the high-temperature gas 46 to the interior surface of the plastic preform and direct the high-pressure gas 38 to the interior surface 60 of the plastic container 40, generally in a perpendicular direction. The consistent and small diameter of the ports 74 enhances the velocity at which the fluids are introduced and further allows for a more even discharge of the fluids along the length of the stretch/blow rod 16'.

Exhausting of the high-temperature gas 46 and the high-pressure gas 38 is accomplished through a channel 76 formed within the blow seal 31. An exhaust valve 78, controlled by the system controller 43, is opened when necessary during the blow molding process. A muffler or silencer 80 may be mounted at the end of the exhaust line 82 to reduce noise during exhausting.

Another variance from the first embodiment is that the pre-blow fluid is no longer provided through the high-temperature gas 46. Instead, a low pressure, low temperature fluid 84 is provided from a source 86 through a line 88 and into the plastic preform 22 through a channel 90, also formed in the blow seal 31. As shown in FIG. 6, the pre-blow fluid 84, preferably air at ambient temperature and at about 200 psi, is provided by the opening of a control valve 92 by the system controller 43 during advancement of the stretch/blow rod 16' and stretching of the plastic preform 22. For maximum control of the pre-blow fluid 84, one control valve 92 is used for each mold cavity of the machine 10.

Figure 7:
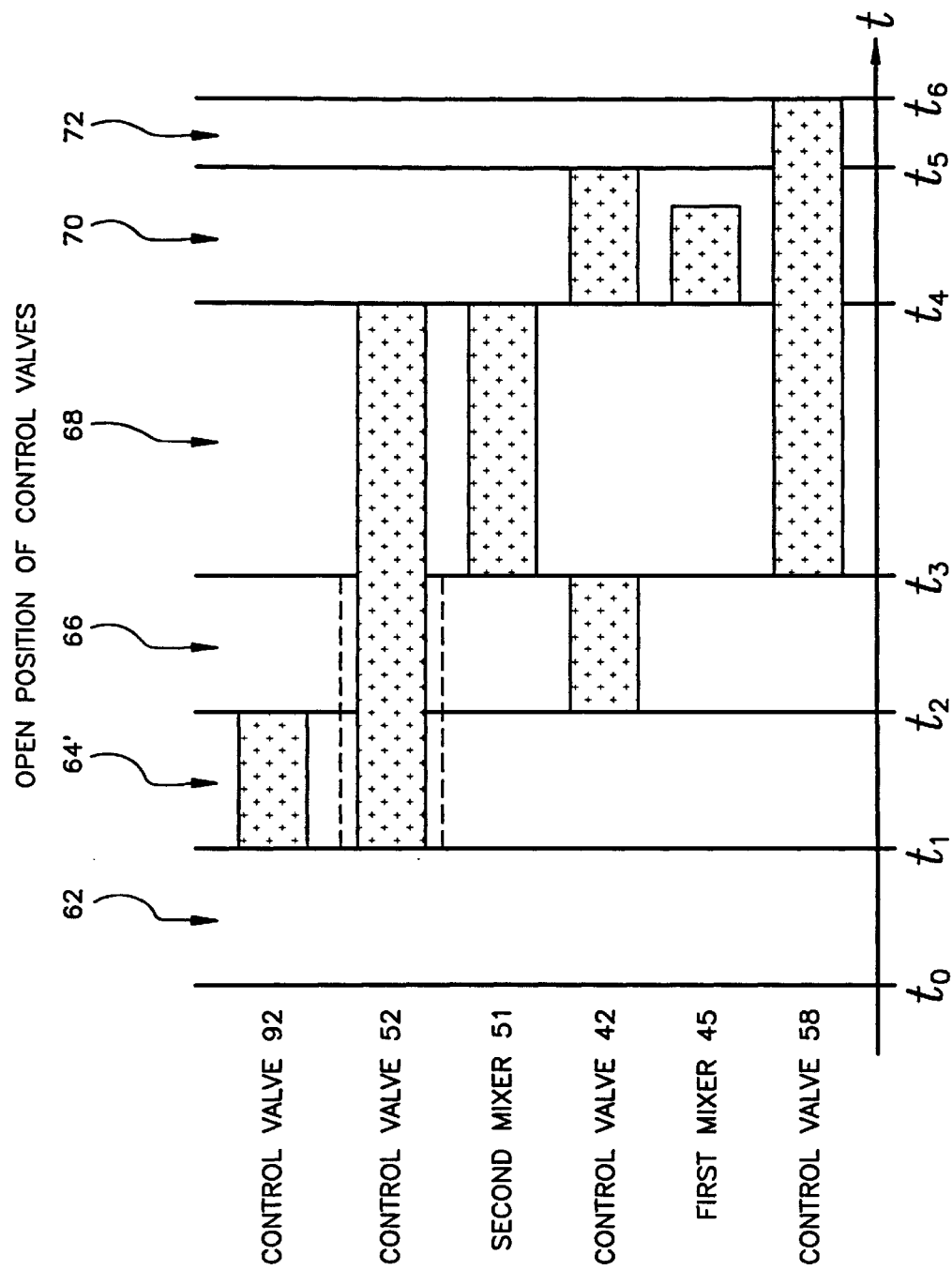
FIG. 7 is a timing chart for the embodiment shown in FIG. 6.

As shown in FIG. 7, at time=$t_1$, the control valve 92 is opened and pre-blow fluid 84 is injected through the channel 90 into the plastic preform 22. This pre-blow stage 64' occurs during stretching of the plastic preform 22 and operates to keep the plastic preform 22 from contacting the stretch/blow rod 16'. At time=$t_2$, the control valve 92 is closed and the control valve 42 is opened to inject the high-pressure gas 38 through the stretch/blow rod 16' and to inflate and expand the plastic preform 22 against the mold cavity 20 thereby forming the plastic container 40. At time=$t_3$, the control valve 42 is closed.

Preferably, at sometime between time=$t_1$ and time=$t_3$, the control valve 52 is opened by the system controller 43. In this manner, when the control valve 42 is closed at time=$t_3$, the high-temperature gas 46 immediately flows through the ports 74 and is directed at the interior surface 60 of the plastic container 40.

The remainder of the process sequence is as described above and reference should be made to that portion of this description.

The foregoing discussion discloses and describes a preferred embodiment of the present invention. One skilled in the art will readily recognize from such discussion, and from the accompanying drawings and claims, that changes and modifications can be made to the invention, including varying the timing sequence, without departing from the true spirit and fair scope of the invention as defined in the following claims.

We claim:

1. A method of producing a heat set plastic container comprising the steps of:
    providing a plastic preform within a mold cavity;
    expanding and stretching said preform into conformity with surfaces defining said mold cavity;
    mixing a high-temperature gas with a fluid in a liquid state and at an ambient temperature and pressure such that a heat transfer coefficient of said high-temperature gas and fluid mixture is greater than a heat transfer coefficient of said high-temperature gas alone; and
    circulating said high-temperature gas and fluid mixture through an interior of the plastic container to induce crystallinity in the plastic container.

2. A method of producing a heat set plastic container comprising the steps of:
    providing a plastic preform within a mold cavity;
    expanding and stretching said preform into conformity with surfaces defining said mold cavity;
    mixing a high-temperature gas and water such that a heat transfer coefficient of said high-temperature gas and water mixture is greater than a heat transfer coefficient of said high-temperature gas alone; and
    circulating said high-temperature gas and water mixture through an interior of the plastic container to induce crystallinity in the plastic container.

3. A method of producing a heat set plastic container comprising the steps of:
    providing a plastic preform within a mold cavity;
    expanding and stretching said preform into conformity with surfaces defining said mold cavity;
    mixing a high-temperature gas with a fluid including atomizing said fluid into said high-temperature gas such that a heat transfer coefficient of said high-temperature gas and fluid mixture is greater than a heat transfer coefficient of said high-temperature gas alone; and
    circulating said high-temperature gas and fluid mixture through an interior of the plastic container to induce crystallinity in the plastic container.

4. A method of producing a heat set plastic container comprising the steps of:
    providing a plastic preform within a mold cavity;
    expanding and stretching said preform into conformity with surfaces defining said mold cavity;
    mixing a high-temperature gas with a fluid such that a heat transfer coefficient of said high-temperature gas and fluid mixture is greater than a heat transfer coefficient of said high-temperature gas alone;
    mixing a low-temperature gas with a second fluid such that a heat transfer coefficient of said low-temperature gas and a second fluid mixture is greater than a heat transfer coefficient of said low-temperature gas alone;
    circulating said high-temperature gas and fluid mixture through an interior of the plastic container to induce crystallinity in the plastic container; and
    circulating said low-temperature gas and second fluid mixture through said interior of the plastic container to cool the plastic container.

5. The method of claim 4 further comprising the step of providing said fluid and said second fluid from a common source prior to the steps of mixing.

6. The method of claim 4 wherein said second mixing step includes mixing said low-temperature gas with a second fluid in a liquid state and at an ambient temperature and pressure.

7. The method of claim 4 wherein said second mixing step includes mixing said low-temperature gas with water.

8. The method of claim 4 wherein said second mixing step includes atomizing said second fluid into said low-temperature gas.

9. The method of claim 4 wherein said second mixing step includes vaporizing said second fluid into said low-temperature gas.

10. A method of producing a heat set plastic container comprising the steps of:
    providing a plastic preform within a mold cavity;
    expanding and stretching said preform into conformity with surfaces defining said mold cavity;
    mixing a high-temperature gas that includes air with a fluid such that a heat transfer coefficient of said high-temperature gas and fluid mixture is greater than a heat transfer coefficient of said high-temperature gas alone; and
    circulating said high-temperature gas and fluid mixture through an interior of the plastic container to induce crystallinity in the plastic container.

11. A method of producing a heat set plastic container comprising the steps of:
    providing a plastic preform within a mold cavity;
    expanding and stretching said preform into conformity with surfaces defining said mold cavity;
    mixing a high-temperature gas having a temperature in the range.of 200° C. to 400° C. with a fluid such that a heat transfer coefficient of said high-temperature gas and fluid mixture is greater than a heat transfer coefficient of said high-temperature gas alone; and circulating said high-temperature gas and fluid mixture through an interior of the plastic container to induce crystallinity in the plastic container.

12. A method of producing a heat set plastic container comprising the steps of:

providing a plastic preform within a mold cavity;

expanding and stretching said preform into conformity with surfaces defining said mold cavity;

mixing a high-temperature gas that is at a pressure in the range of 100 psi to 600 psi with a fluid such that a heat transfer coefficient of said high-temperature gas and fluid mixture is greater than a heat transfer coefficient of said high-temperature gas alone; and circulating said high-temperature gas and fluid mixture through an interior of the plastic container to induce crystallinity in the plastic container.

13. A method of producing a heat set plastic container comprising the steps of:

providing a plastic preform within a mold cavity;

expanding and stretching said preform into conformity with surfaces defining said mold cavity;

mixing a high-temperature gas with a fluid for a duration in the range of 1 second to 15 seconds such that a heat transfer coefficient of said high-temperature gas and fluid mixture is greater than a heat transfer coefficient of said high-temperature gas alone; and circulating said high-temperature gas and fluid mixture through an interior of the plastic container to induce crystallinity in the plastic container.

* * * * *